Jan. 16, 1951     M. H. NORTH     2,538,468
RATCHET HEAD FOR THREADED BOLTS
Filed Aug. 9, 1948

Mill H. North
INVENTOR.

BY *Clarence A. O'Brien
and Harvey B. Jacobson*
Attorneys

Patented Jan. 16, 1951

2,538,468

UNITED STATES PATENT OFFICE 2,538,468

RATCHET HEAD FOR THREADED BOLTS

Mill H. North, Charleston, Utah

Application August 9, 1948, Serial No. 43,175

1 Claim. (Cl. 85—9)

This invention relates to a novel lock nut attachment for bolts or screws and has for its primary object the provision of a nut to which a wrench may be applied in such a manner that it becomes unnecessary to remove the wrench at any time during the tightening or loosening of the bolt or screw.

Another object of the invention is to provide a lock nut attachment for a bolt or screw which includes a pair of spaced shoulders fixed to the bolt, opposed oppositely inclined ratchet teeth on the shoulders, and a member freely rotatable on the bolt between the shoulders for selectively engaging the ratchet teeth whereby the bolt is selectively tightened in or loosened from an internally threaded nut or sleeve.

These, together with various ancillary objects and features of the invention which will later become apparent as the following description proceeds, are attained by the device, a preferred embodiment of which has been illustrated by way of example only in the accompanying drawings, wherein.

Specific reference is now made to the drawings. In the several views in the accompanying drawings and in the following specification reference characters indicate corresponding elements throughout.

Figure 1:
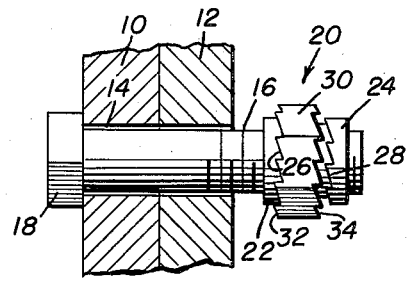
Figure 1 is a side elevation of the device attached to a bolt engaging a smooth bore, the members to be secured together being shown in section.
Figure 2:
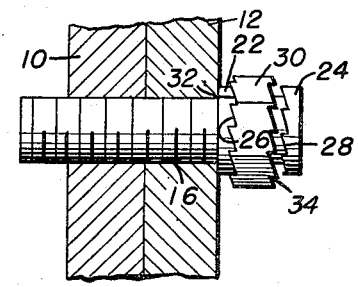
Figure 2 is a view similar to Figure 1, showing the device attached to a bolt engaging an internally threaded sleeve.
Figure 3:
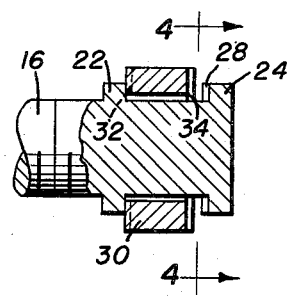
Figure 3 is a fragmentary longitudinal sectional view through the device shown in Figure 2.
Figure 4:
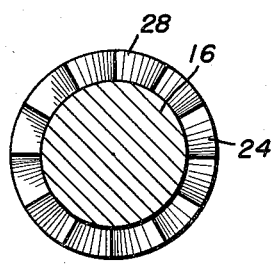
Figure 4 is a sectional view taken on the line 4—4 of Figure 3.

Indicated at 10 and 12 are a pair of members, such as boards, to be joined by a bolt or screw. In Figure 1, the members include a smooth bore 14 and the externally threaded bolt 16 engages this bore and is provided with an integral head 18. In Figure 2, the members include an internally threaded bore for engageably receiving the bolt 16.

The attachment or lock nut of the instant invention, generally indicated at 20, includes a first shoulder 22 which is fixedly secured to the bolt 16, and a second similarly formed shoulder 24 spaced from the first shoulder. The outer face of shoulder 22 has ratchet teeth 26 while the inner face of the shoulder 24 has ratchet teeth 28 which are oppositely inclined with respect to the teeth 26.

Freely rotatable on the bolt intermediate the shoulders is a nut 30 having ratchet teeth 32 and 34 formed on opposite sides of the nut. The teeth 32 correspond in inclination to the teeth 26 on the first shoulder, while the teeth 34 correspond in inclination to the teeth 28 on the second shoulder.

In practical operation, rotation of the nut 30 in a clockwise direction after it has been moved on the bolt to engage the first shoulder 22 will cause a rotation of the bolt in a forward direction. Rotation of the nut 30 in a counterclockwise direction after it has been moved on the bolt to engage the second shoulder 24 will cause a rotation of the bolt in a reverse direction.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a fastener having an externally threaded bolt, a ratchet head comprising a first shoulder secured to said bolt having ratchet teeth on the outer face thereof, a second shoulder spaced from said first shoulder having ratchet teeth on the inner face thereof, and a polygonal nut-like member interposed between said shoulders rotatable on said bolt having ratchet teeth on opposite faces thereof, the distance between diametrically opposite flats of said nut-like member being substantially greater than said second shoulder, the ratchet teeth on the first shoulder being inclined to engage corresponding teeth on the nut-like member when the latter is rotated in a forward direction and the ratchet teeth on the second shoulder being inclined to engage the corresponding teeth on the nut-like member when the latter is rotated in a reverse direction.

MILL H. NORTH.

REFERENCES CITED

The following references are of record in the file of this patent:

UNITED STATES PATENTS

| Number | Name | Date |
|---|---|---|
| 106,036 | Dickson | Aug. 2, 1870 |
| 862,244 | Garratt | Aug. 6, 1907 |

FOREIGN PATENTS

| Number | Country | Date |
|---|---|---|
| 108,532 | Great Britain | Aug. 13, 1917 |
| 111,048 | Australia | July 25, 1940 |